United States Patent [19]

Midorikawa

[11] Patent Number: 5,073,220
[45] Date of Patent: Dec. 17, 1991

[54] METHOD FOR PRODUCING A GRIPPING STICK

[75] Inventor: Yoshio Midorikawa, Tokyo, Japan

[73] Assignee: Tohyo Porimah Kabushikigaisha, Tokyo, Japan

[21] Appl. No.: 336,810

[22] Filed: Apr. 12, 1989

[30] Foreign Application Priority Data

Apr. 23, 1988 [JP] Japan .................................. 63-99331

[51] Int. Cl.$^5$ ............................................. B29C 47/06
[52] U.S. Cl. ........................... 156/244.11; 156/244.12; 156/279; 428/87; 428/143; 428/147; 428/206
[58] Field of Search ...................... 156/244.11, 244.12, 156/244.13, 244.14, 279, 293; 264/209.1, 209.7; 428/87, 143, 147, 206, 217, 218

[56] References Cited

U.S. PATENT DOCUMENTS

| | | | |
|---|---|---|---|
| 2,793,136 | 5/1957 | Root | 428/147 |
| 2,932,323 | 4/1960 | Aries | 156/244.11 |
| 4,540,195 | 9/1985 | Smith-Johannsen | 156/244.12 |
| 4,589,940 | 5/1986 | Johnson | 156/293 |

*Primary Examiner*—Caleb Weston
*Attorney, Agent, or Firm*—Stevens, Davis, Miller & Mosher

[57] ABSTRACT

A gripping stick such as penholders, toothbrushes and shaving holders, in which a skin layer whose main component is polyolefin resin is laminated on a substrate layer formed of high melting point high-density polyolefin resin, the skin layer comprising an elastomer of low melting point low-density polyolefin resin within which high melting point high-density polyolefin resin powder remains in the form of solid particles and a mat-tone or rough surface is formed on the surface of the skin layer.

3 Claims, 2 Drawing Sheets

METHOD FOR PRODUCING A GRIPPING STICK

BACKGROUND OF THE INVENTION

1. Field of the Invention

The present invention relates to a gripping stick held by hand such as penholders, toothbrush holders, shaving holders and the like and method for producing the same.

2. Description of the Prior Art

The present applicant has previously invented and disclosed, in Japanese Patent Application Laid-Open No. 103,109/1987, a penholder with an anti-skid means, in which an outer stick is formed from an integral extrusion molded material comprising a substrate portion and a skin layer serving as an anti-skid means when gripped which covers a part of the surface as viewed at least from the cross-sectional direction and is continuous over the full length, material for the substrate portion comprises polypropylene or polyethylene according to middle and low pressure method, and material for the skin layer comprises an olefin family thermoplastic elastomer.

The above described invention has an effect in a way in that a penholder may be easily gripped because an anti-skid means is provided on a penholder such as a ballpoint pen. However, the penholder according to the aforesaid invention is that the anti-skid effect merely depends upon softness and resiliency of soft-polyolefin but has a problem in that an olefin family elastomer is sticky. There still has a problem in that there is no hold for a fingertip when held, thus being easily slipped.

The present inventor has further invented a penholder in which a skin layer thereof is formed of a soft vinyl chloride. In this case, when vinyl chloride is made to serve as anti-skid means, a rubber-tone property is imparted to the surface thereof, and therefore, phthalic ester (for example, DOP) is used. However, there poses a problem that the phthalic ester is toxic.

SUMMARY OF THE INVENTION

In order to solve the problems noted above with respect to prior art, the present invention takes the following method for making a gripping stick such as penholders, toothbrushes, and shaving holders.

Namely, method for producing a gripping stick in which a skin layer is laminated on a substrate layer formed of high melting point high-density, polyolefin resin, the method comprising the steps of;

feeding high melting point high-density, polyolefin resin for forming a substrate layer in a extrusion die, feeding mixed resin mixed low melting point low-density polyolefin resin powder and high melting point high-density polyolefin powder around said resin for forming a substrate layer resin in said extrusion die, heating said resin for forming the substrate layer and said mixed resin powder for forming the skin layer, setting said heating temperature to a level higher than a melting point of the low melting point low-density polyolefin resin but lower than a melting point high-density polyolefin resin, and gelling the low melting point low-density polyolefin resin powder and making it to an elastomer, forming the skin layer around the substrate layer of the high melting point high-density polyolefin resin, when these resins are extruded from the extrusion die, said skin layer remaining the high melting point high-density resin powder in the form of solid particles in the elastomer of the low melting point low-density polyolefin resin.

With the employment of such structure, the present invention can provide a gripping stick in which when a holder is held by hand, a hold to the fingertip can be provided along with the resiliency of elastomer, and which can be easily held and has an elegant design.

In the present invention, the low melting point low-density polyolefin and high melting point high-density polyolefin forming the skin layer are selected by the following reasons.

(1) High density polyolefin, especially polyethylene, is good in crystallization, in result of it, its particles hardness, strength heat proof and cold proof are very great. Consequently, after high-density polyolefin is pressed and heated in the extrusion die and extruded from the die, high-density polyolefin resin powder remains in the form of solid particles within the elastomer of the low-density polyolefin.

So high-density powder in the form of solid particles does not allow for fingers of the people to slip when the people hold a stick.

(2) On the other hand, low-density polyolefin is small in specific gravity, great in mechanical strength and works easy in extrusion process.

And more, low-density polyolefin is good in fluidity when it is made to elastomer in the extrusion die. Then, particles of high-density polyolefin resin powder remove to surface of of said elastomer of the low-density polyolefin.

Particles of the high-density polyolefin resin powder and said elastomer of the low-density polyolefin resin become one body firmly, because they are same type resins.

The present inventor tested other resin powder except high-density polyolefin for the same object of the present invention, but the high-density polyolefin powder was most excellent as a particle being remained within the elastomer of the low-density polyolefin, because high-density polyolefin is good in crystalization.

DETAILED DESCRIPTION OF THE PREFERRED EMBODIMENTS

Figures 1, 2:
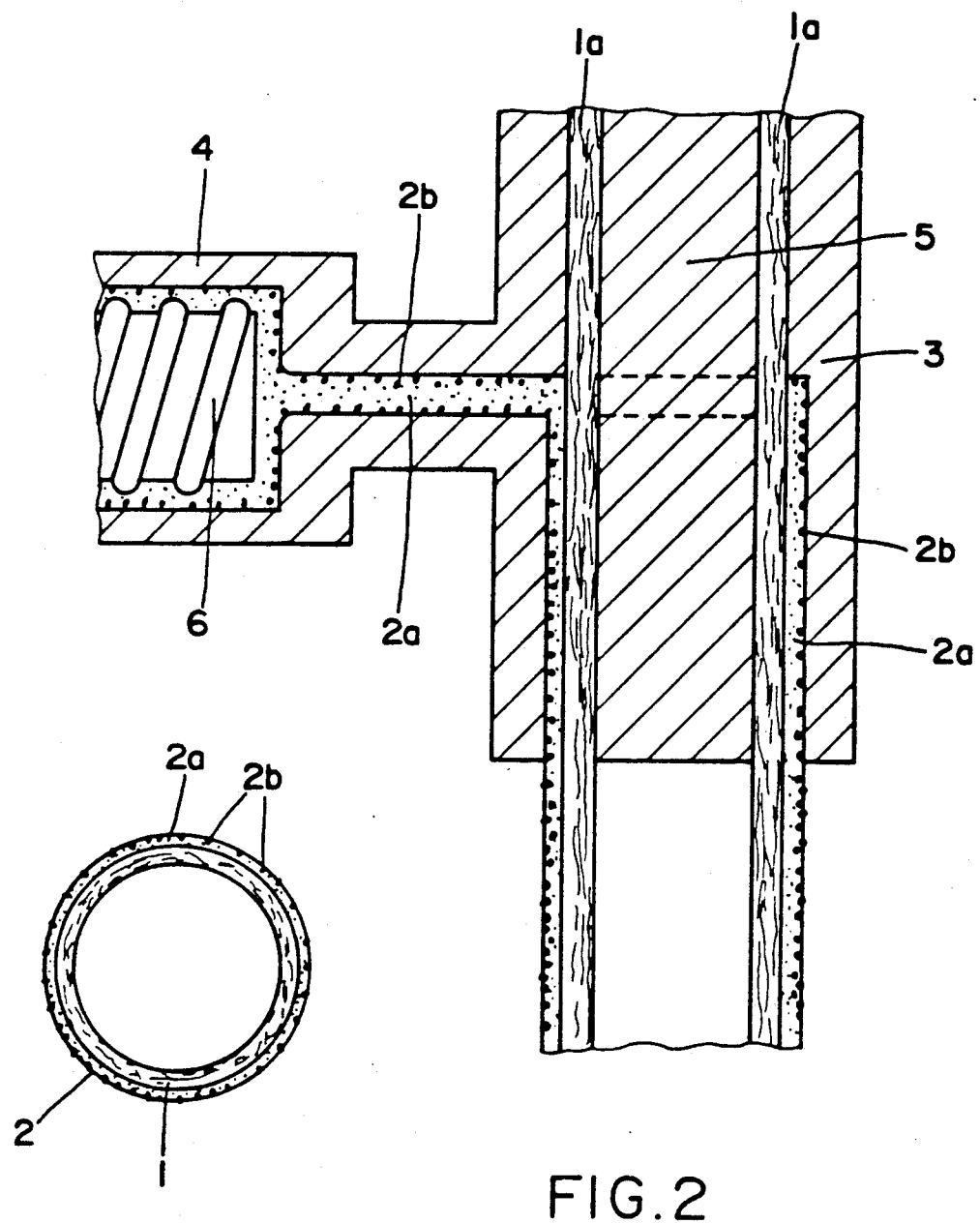
FIG. 1 is a sectional view of a gripping stick according to the present invention.
FIG. 2 is a sectional view of an extrusion die for producing a gripping stick according to the present invention.
Figure 3:
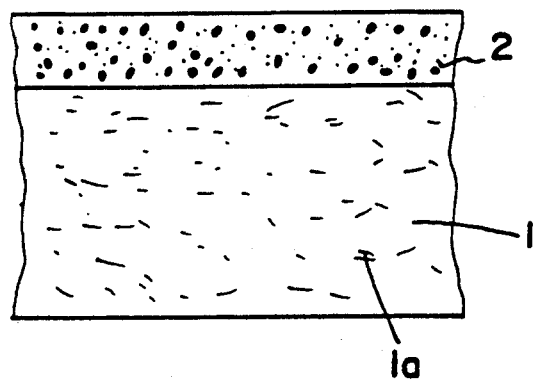
FIG. 3 is a sectional view of a skin layer in the case where high melting point high-density resin powder is not deposited.

An embodiment of the present invention will be described hereinafter.

In the drawings:

Reference numeral 1 designates a substrate layer of a gripping stick, which is formed of high melting point high-density polyolefin resin 1a, namely, polyethylene or polypropylene or their mixture.

Reference numeral 2 designates a skin layer of a gripping stick, which is formed of a mixture of low melting point low-density polyolefin resin powder 2a and high melting point high-density polyolefin resin powder 2b. This structure will be described in detail later.

Reference numeral 3 designates an extrusion die for joining and laminating a substrate layer 1 and a skin layer 2.

Reference numeral 4 designates an extrusion die for feeding low melting point low-density polyolefin resin powder 2a and high melting point high-density polyolefin resin powder 2b of the skin layer.

Reference 5 designates a toe beat for the extrusion die 3.

Reference numeral 6 designates a screw for the extrusion die.

The operation will be described.

The high melting point high-density polyolefin resin powder 1a for forming the substrate layer 1 is fed into the extrusion die 3, and the mixture of the low melting point low-density polyolefin resin powder 2a and high melting point high-density polyolefin resin powder 2b for forming the skin layer 2 is fed around said resin for forming the substrate layer 1 by the screw 6 in the extrusion die 4. While it is preferred that as polyolefin forming the skin layer 2, only polyethylene or only polypropylene or their mixture.

Then, in the extrusion die 3, said resin 1a for forming the substrate layer 1 and said mixture of resins for forming the skin layer 2 are laminated. At that time, at the joined part or portions other than the former, these resins are heated between both the melting points to bond them together, and low melting point low-density polyolefin resin powder 2a for forming the skin layer 2 is molten and gelled. At that time, high melting point high-density polyolefin resin powder 2b is not molten and therefore remains in the form of solid particles.

Figure 4:
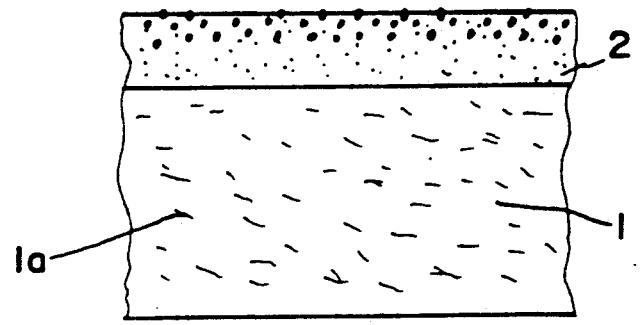
FIG. 4 is a sectional view of a skin layer in the case where high melting point high-density resin powder is deposited.

When said low-density polyolefin resin 2a is extruded out of the extrusion die 3, it is formed into an elastomer, and said high-density polyolefin resin powder 2b remains in the form of solid particles within the elastomer of said low-density resin 2a. The high-density polyolefin powder 2b is removed toward the wall surface of an extrusion path by the extrusion force of the screw 6 and is levitated from the elastomer gelled when the low-density polyolefin resin 2a is molten, thus assuming the state wherein it is deposited on the surface of the skin layer 2 as shown in FIG. 4.

Said high-density polyolefin resin powder 2b is deposited as described above, whereby the surface of the skin layer 2 tends to be formed into a mat-tone and rough surface.

As this time, the content of the low-density polyolefin resin 2a is 15 to 30% with respect to the high-density polyolefin resin powder 2b.

In terms of viscosity, if the content of the low-density polyolefin resin 2a is larger than the aforesaid amount, the mat-tone and rough surface becomes excessively rough, while if it is smaller than the aforesaid amount, the effect of the surface tissue of the mat-tone or the like becomes deteriorated.

The high melting point high-density polyolefin resin powder 2b used includes resin powder as trade names "FZ-70, BX-70 etc." which is a product of Mitsubishi Yuka., Ltd. of Japan.

Particulars of these resin powder are as follows.

| | |
|---|---|
| Grain size | 10 to 300 μ |
| Duro hardness | 50 to 80 |
| Bikatto softening temperature | 110–130° C. |
| Heat transformation temperature | 70–85° C. |
| Melting point | 130–150° C. |

-continued

| | |
|---|---|
| Molecular weight | 60,000–110,000 |
| Density | |
| Polyethylene | 0.94–0.96 |
| Polypropylene | 0.93–0.94 |

Incidentally, high melting point high-density polyethylene resin made in Mitsubishi Yuka Co., Ltd. has the following qualities.

| | Density g/cm³ | Duro hardness | Bikatto softening temp. °C. | Heat transforming temp. °C. | Melting point °C. |
|---|---|---|---|---|---|
| FZ70 | 0.950 | 69 | 123 | 80 | 132 |
| BX70 | 0.956 | 72 | 126 | 83 | 138 |
| FZ50D | 0.954 | 71 | 123 | 78 | 134 |
| EZ40-9 | 0.952 | 70 | 123 | 78 | 133 |
| EY50D | 0.942 | 68 | 120 | 78 | 130 |

Among these particulars, the grain size is greatly related to the surface of the skin layer 2. If the thickness of the skinlayer 2 is 0.1 to 0.2 mm, and the mixed amount of the high melting point high-density polyolefin resin powder 2b with respect to the low melting point low-density polyolefin resin 2a is 15 to 30%, then the following is obtained.

| | |
|---|---|
| 10 to 100 μ | lighten mat-tone |
| 80 to 150 μ | rough mat-tone |
| 300 μ | rough mat-tone |

When high melting point high-density polypropylene and low melting point low-density polypropylene are used as polyolefin forming the skin layer 2, the skin layer 2 becomes smaller than in specific gravity than the case using polyethlene and put up with stress-cracking well.

What is claimed is:

1. A method for producing a gripping stick in which a skin layer is laminated on a substrate formed of high melting point high-density polyolefin resin, the method comprising the steps of:

feeding high melting point high-density polyolefin resin into a extrusion die to form a substrate, feeding a mixture of low melting point low-density polyolefin resin powder and high melting point high-density polyolefin resin powder into said extrusion die around said substrate to envelop the outside of said substrate in said extrusion die, heating said enveloped substrate to a temperature higher than the melting point of the low melting point low-density polyolefin resin but lower than the melting point of said high-density density polyolefin resin, gelling the low melting point low-density polyolefin resin to form a layer around said substrate, extruding said layered substrate from said extrusion die whereby said low melting point low density polyolefin resin forms into an elastomer, and said high melting point high-density polyolefin resin in said layer, remains in the form of solid particles at the outer edge of the elastomer.

2. The method of claim 1 wherein the polyolefin resin is polyethylene or polypropylene.

3. The method of claim 1 wherein the feeding of the high melting point high-density polyolefin resin powder to the extrusion die is conducted under sufficient pressure to force the powder to the outer surface of the gel during extrusion.

* * * * *